United States Patent
Shin

(10) Patent No.: US 11,358,277 B2
(45) Date of Patent: Jun. 14, 2022

(54) ROBOT SYSTEM AND CONTROL METHOD OF THE SAME

(71) Applicant: LG ELECTRONICS INC., Seoul (KR)

(72) Inventor: Changeui Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 315 days.

(21) Appl. No.: 16/565,786

(22) Filed: Sep. 10, 2019

(65) Prior Publication Data
US 2020/0016753 A1    Jan. 16, 2020

(30) Foreign Application Priority Data
Aug. 21, 2019 (KR) .......... 10-2019-0102241

(51) Int. Cl.
| | |
|---|---|
| *B25J 9/16* | (2006.01) |
| *B25J 19/06* | (2006.01) |
| *B25J 11/00* | (2006.01) |
| *B25J 19/02* | (2006.01) |
| *B25J 13/08* | (2006.01) |
| *B25J 15/00* | (2006.01) |

(52) U.S. Cl.
CPC .......... *B25J 9/1674* (2013.01); *B25J 9/1679* (2013.01); *B25J 9/1694* (2013.01); *B25J 11/0045* (2013.01); *B25J 13/087* (2013.01); *B25J 19/02* (2013.01); *B25J 19/061* (2013.01); *B25J 15/0009* (2013.01)

(58) Field of Classification Search
CPC ........ B25J 19/02; B25J 9/0087; B25J 19/061; B25J 13/087; B25J 9/1674; B25J 9/1679; B25J 11/0045; B25J 9/0018; B25J 9/1694; B25J 15/0009; A47J 36/32; A47J 44/00; G05B 2219/39001; G05B 2219/45241
See application file for complete search history.

(56) References Cited

U.S. PATENT DOCUMENTS

| | | | | |
|---|---|---|---|---|
| 4,503,502 | A * | 3/1985 | Chapin | A47J 27/14 99/335 |
| 5,349,163 | A * | 9/1994 | An | H05B 6/6458 219/707 |
| 10,502,430 | B1 * | 12/2019 | Alvey | F24C 7/085 |

(Continued)

FOREIGN PATENT DOCUMENTS

JP    4531832 B2    8/2010

*Primary Examiner* — Stephen Holwerda
(74) *Attorney, Agent, or Firm* — Birch, Stewart, Kolasch & Birch, LLP

(57) ABSTRACT

A robot system includes a cooking device to heat a cooking container and having an operation unit configured to select a temperature level; a robot configured to control the temperature level and a cooking time of the cooking device; a dust sensor disposed around the cooking device or on the robot to sense a concentration of foreign substances; a temperature sensor disposed around the cooking device or on the robot to sense a temperature of the cooking container or the cooking device; and a controller configured to control the robot in a safe mode such that at least one of the temperature level and the cooking time is varied according to a danger level determined by a concentration sensing value of the dust sensor and a temperature sensing value of the temperature sensor.

19 Claims, 5 Drawing Sheets

(56) References Cited

U.S. PATENT DOCUMENTS

| | | | | |
|---|---|---|---|---|
| 2004/0172380 | A1* | 9/2004 | Zhang | B25J 9/1682 |
| 2009/0099691 | A1* | 4/2009 | Tojo | B25J 9/0003 |
| | | | | 901/41 |
| 2009/0297678 | A1* | 12/2009 | Liu | A23L 5/11 |
| | | | | 426/438 |
| 2013/0084369 | A1* | 4/2013 | Smrke | A47J 36/32 |
| | | | | 99/325 |
| 2015/0114236 | A1* | 4/2015 | Roy | A47J 44/00 |
| | | | | 901/41 |
| 2015/0290795 | A1* | 10/2015 | Oleynik | G05B 19/42 |
| | | | | 700/257 |
| 2016/0033140 | A1* | 2/2016 | Weaver, Jr. | F24C 14/00 |
| | | | | 219/393 |

* cited by examiner

ROBOT SYSTEM AND CONTROL METHOD OF THE SAME

CROSS-REFERENCE TO RELATED APPLICATIONS

This application claims the benefit of priority to Korean Patent Application No. 10-2019-0102241, filed in the Korean Intellectual Property Office on Aug. 21, 2019, the entire contents of which are incorporated herein by reference.

FIELD OF THE DISCLOSURE

The present disclosure relates to a robot system and a control method of the same.

Robots are machines that automatically process given tasks or operate with their own capabilities. The application fields of robots are generally classified into industrial robots, medical robots, aerospace robots, and underwater robots. Recently, communication robots that can communicate with humans by voices or gestures have been increasing.

Recently, a cooking robot capable of cooking by using a robot is gradually increased and an example of such a robot is a cooking assistant robot disclosed in Japanese Patent Publication No. 4531832 (published on Aug. 25, 2010).

The cooking assistant robot is a robot that assists cooking using a cooking container disposed on a cooking burner, and includes a hand part, an arm part for changing the position and posture of the hand part, and a support part for supporting the arm part as well as at least six movable parts capable of arbitrarily changing the position and posture of the hand part.

SUMMARY

Embodiments provide a robot system and a control method thereof, capable of continuing cooking by a cooking device while minimizing the possibility of fire caused by fine dust and the like around the cooking device.

In one embodiment, a robot system includes a cooking device having an operation unit configured to select a temperature level to heat a cooking container with the temperature level selected by the operation unit; a robot configured to control a temperature level and a cooking time of the cooking device; a dust sensor disposed around the cooking device or on the robot to sense a concentration of foreign substances; a temperature sensor disposed around the cooking device or on the robot to sense a temperature of the cooking container or the cooking device; and a controller configured to control the robot in a safe mode such that at least one of the temperature level and the cooking time is varied according to a danger level determined by a concentration sensing value of the dust sensor and a temperature sensing value of the temperature sensor.

The robot may include a robot arm having a plurality of arms and at least one arm connector connecting the plurality of arms; and an end effector installed on the robot arm.

The dust sensor may be installed on the robot arm, and

The temperature sensor may include an infrared sensor installed on the end effector.

The dust sensor and the temperature sensor may be disposed at a height parallel to an upper portion of the cooking device or the cooking container.

When the danger level by the concentration sensing value is different from the danger level by the temperature sensing value, the controller may control the robot to operate the cooking device with a temperature level and a cooking time according to a higher danger level.

When the concentration sensing value is less than a lower limit concentration and the temperature sensing value is less than a lower limit temperature, the danger level may be a lowest level and the controller may control the robot in a normal cooking mode.

The controller may control the robot to lower the temperature level and to lengthen the cooking time as the danger level is higher.

The robot system may further include an alarm device. The controller may be configured to output a signal of alarm information to the alarm device when the danger level is equal to or higher than an alarm level.

The controller may be configured to stop an operation of the cooking device by the robot when the danger level is a highest level.

In another embodiment, there is provided a method of controlling a robot system including a cooking device configured to heat a cooking container and a robot configured to adjust a temperature level and a cooking time of the cooking device, in which the method includes sensing a foreign substance concentration using a dust sensor disposed around the cooking device or on the robot, and sensing a temperature of the cooking container or the cooking device using a temperature sensor disposed around the cooking device or on the robot; and when the danger level determined by the concentration sensing value and the temperature sensing value sensed in the sensing operation is changed and the danger level is not a lowest level or a highest level, variably controlling the cooking device, by the robot, with a temperature level and a cooking time according to the changed danger level.

When the danger level by the concentration sensing value is different from the danger level by the temperature sensing value, the cooking device may be controlled with a temperature level and a cooking time according to a higher danger level in the variable control operation.

The danger level may be a lowest level when the concentration sensing value is less than a lower limit concentration and the temperature sensing value is less than a lower limit temperature, and the method may further include performing a normal cooking of maintaining a current cooking of the cooking device when the danger level is the lowest level.

The method may further include performing a normal cooking of maintaining a current cooking of the cooking device when the danger level determined by the concentration sensing value and the temperature sensing value sensed in the sensing operation is not changed.

The robot may be controlled to lower the temperature level and to lengthen the cooking time as the danger level is higher in the variable control operation.

The method may further include outputting a signal of alarm information to an alarm device when the danger level is equal to or higher than an alarm level.

The method may further include stopping an operation of the cooking device by the robot when the danger level is a highest level.

DETAILED DESCRIPTION OF THE PREFERRED EMBODIMENTS

Figure 1:
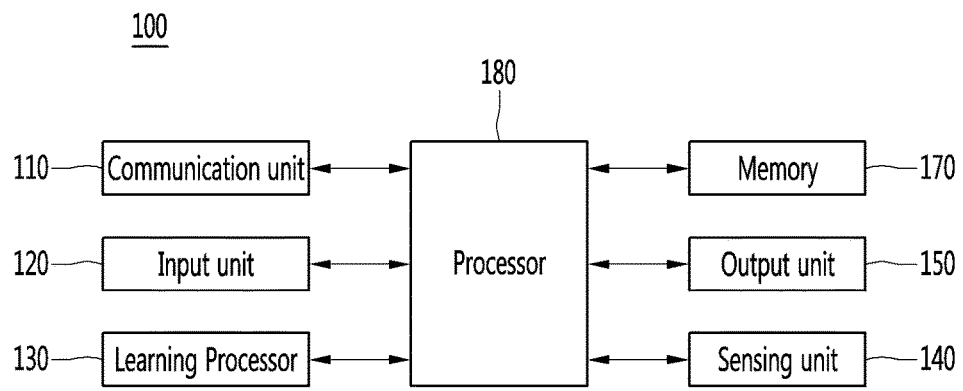
FIG. 1 is a view illustrating an AI device constituting a robot system according to an embodiment.

Hereinafter, preferred embodiments of the present invention will be described in detail with reference to the drawings.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 100 including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 500 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 540 of the AI server 500.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 540 of the AI server 500, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 500. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
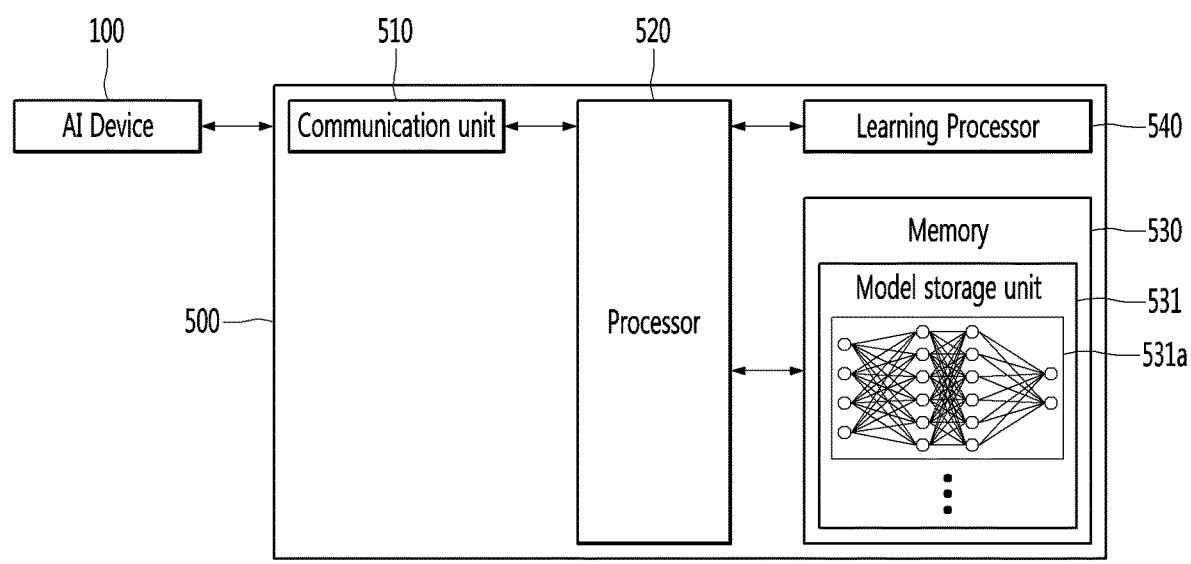
FIG. 2 is a view illustrating an AI server of a robot system according to an embodiment.

FIG. 2 illustrates an AI server 500 connected to a robot according to an embodiment of the present invention.

Referring to FIG. 2, the AI server 500 may refer to a device that learns an artificial neural network by using a machine learning algorithm or uses a learned artificial neural network. The AI server 500 may include a plurality of servers to perform distributed processing, or may be defined as a 5G network. At this time, the AI server 500 may be included as a partial configuration of the AI device 100, and may perform at least part of the AI processing together.

The AI server 500 may include a communication unit 510, a memory 530, a learning processor 540, a processor 520, and the like.

The communication unit 510 can transmit and receive data to and from an external device such as the AI device 100.

The memory 530 may include a model storage unit 531. The model storage unit 531 may store a learning or learned model (or an artificial neural network 531a through the learning processor 540.

The learning processor 540 may learn the artificial neural network 531a by using the learning data. The learning model may be used in a state of being mounted on the AI server 500 of the artificial neural network, or may be used in a state of being mounted on an external device such as the AI device 100.

The learning model may be implemented in hardware, software, or a combination of hardware and software. If all or part of the learning models is implemented in software, one or more instructions that constitute the learning model may be stored in memory 530.

The processor 520 may infer the result value for new input data by using the learning model and may generate a response or a control command based on the inferred result value.

Figure 3:
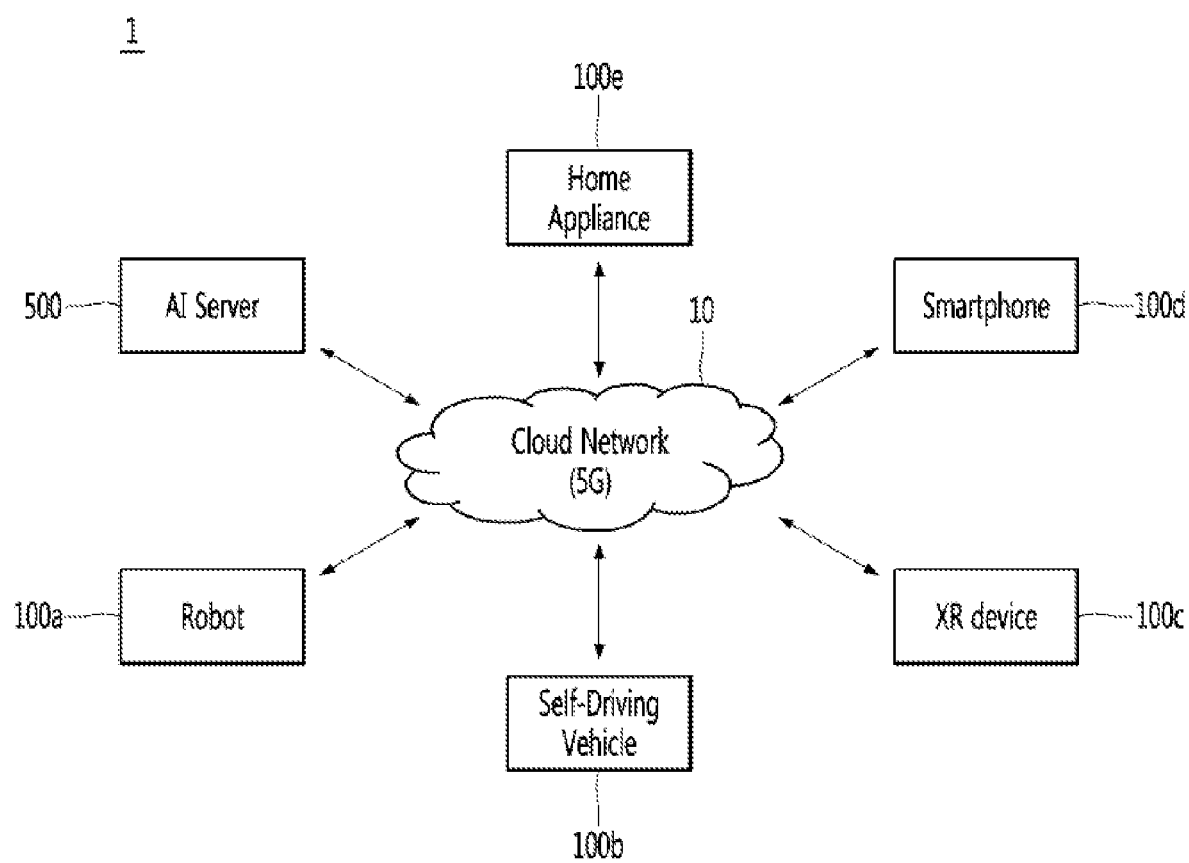
FIG. 3 is a view illustrating an AI system to which a robot system is applied according to an embodiment.

FIG. 3 illustrates an AI system 1 according to an embodiment of the present invention.

Referring to FIG. 3, in the AI system 1, at least one of an AI server 500, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices (AI devices 100a to 100e and AI server 500) configuring the AI system 1 may be connected to each other through the cloud network 10. In particular, each of the devices 100a to 100e and 500 may communicate with each other through a base station, but may directly communicate with each other without using a base station.

The AI server 500 may include a server that performs AI processing and a server that performs operations on big data.

The AI server 500 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 500 may learn the artificial neural network according to the machine learning algorithm instead of the AI devices 100a to 100e, and may directly store the learning model or transmit the learning model to the AI devices 100a to 100e.

At this time, the AI server 500 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 500.

At this time, the robot 100a may perform the operation by generating the result by directly using the learning model, but the sensor information may be transmitted to the external device such as the AI server 500 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

The robot system of the present embodiment may be a chef robot system capable of cooking using a robot 100a and a home appliance 100e, in particular, a cooking device, and the cooking device will be denoted with reference numeral 100e.

The robot 100a and the cooking device 100e may be arranged together in a kitchen of a general home, and may be arranged together in a restaurant such as a cafeteria.

Figure 4:
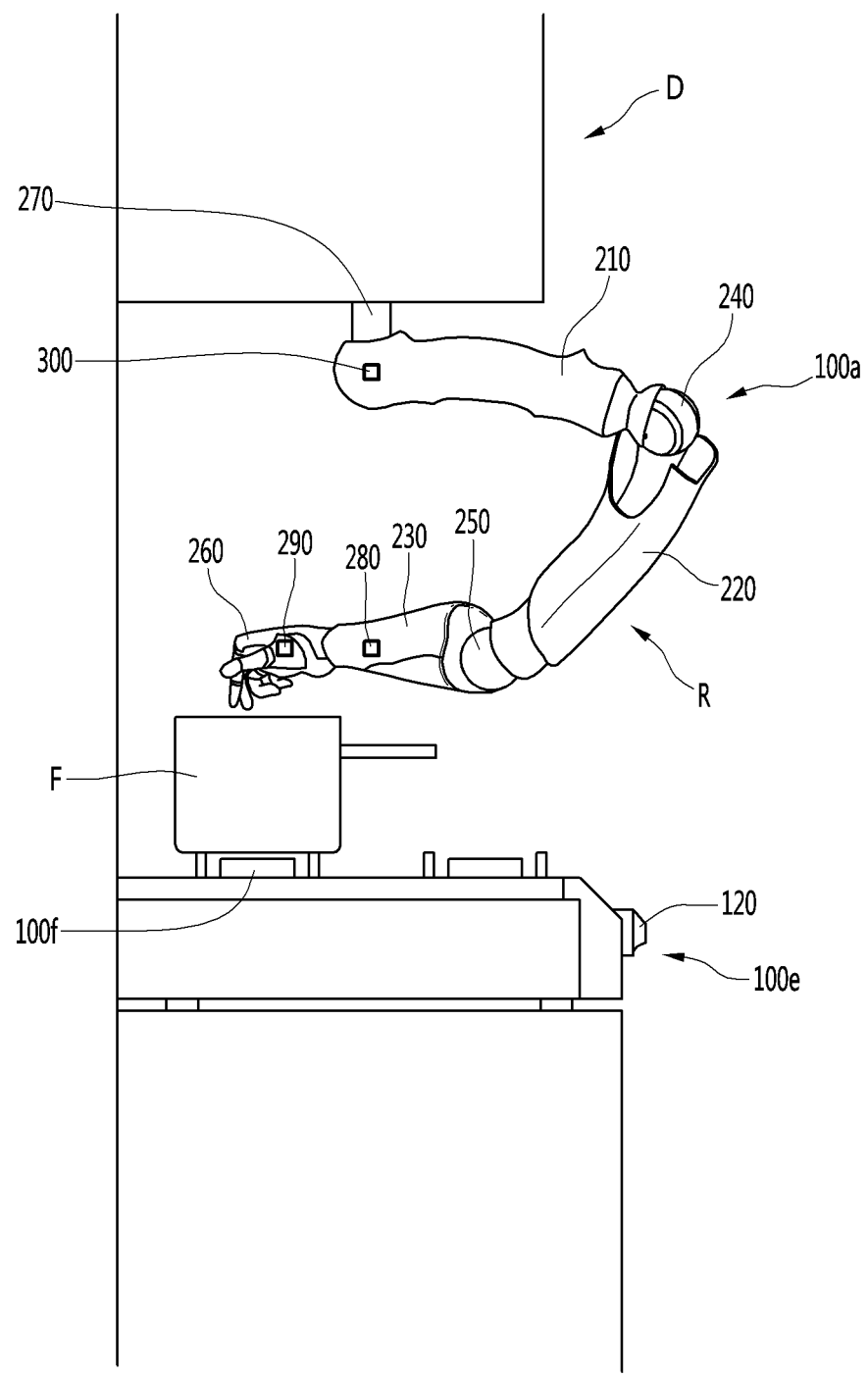
FIG. 4 is a side view illustrating an example of a robot system according to an embodiment.

FIG. 4 is a side view illustrating an example of a robot system according to an embodiment.

The cooking device 100e may be a home appliance that heats a cooking container F placed thereon or therein, may be a gas range that heats cooking containers F such as a frying pan or a pot (hereinafter referred to as a cooking container F) by using gas, or an electric range that heats the cooking container F placed thereon by using an induction heater or an electric heater.

The cooking device 100e may include an input unit for inputting an on/off signals, a temperature level, a cooking time, and the like, which will be described below as an operation unit 120.

The operation unit 120 may be configured to be touch-operated or rotated/pushed by the robot 100a or a user.

For example, the operation unit 120 may be provided at one side of the cooking device 100e to receive an operation command of the cooking device 100e. In another example, the operation unit 120 may be spaced apart from the cooking device 100e and electrically/wirelessly connected to the cooking device 100e to receive the operation command of the cooking device 100e.

The operation unit 120 may be configured to select a temperature level. The operation unit 120 may include a temperature adjusting unit that allows the user or the robot 100a to adjust the temperature of the cooking container F.

One example of the temperature adjusting unit may include a touch operating mechanism such as a touch panel including a temperature rising unit to which a temperature rising command is input and a temperature lowering unit to which a temperature falling command is input.

Another example of the temperature adjusting unit may include a temperature adjusting mechanism having a rotary knob that the user holds and rotates or a button that the robot 100a or the user presses.

The temperature adjusting unit may be configured by combining the touch operating mechanism and the temperature adjusting mechanism, and the type of the temperature adjusting unit is not limited as long as it can receive a command by the physical action of the robot 100a or the user.

The operation unit 120 may be configured such that a cooking time can be selected, and the operation unit 120 may include a time adjusting unit through which the user or the robot 100a may set the entire cooking time.

The time adjusting unit may include, for example, a touch operating mechanism such as a touch panel including a time controller configured to set the cooking time longer or shorter.

Another example of the time adjusting unit may include a timer mechanism having a rotary knob that the robot 100a or the user holds and rotates or a button that the robot 100a or the user presses to set the cooking time longer or shorter.

The time adjusting unit may be configured by combining the touch operating mechanism and the timer mechanism, and the type of the time adjusting unit is not limited as long as it can receive a command by the physical action of the robot 100a or the user.

Meanwhile, the robot system may be configured such that the temperature adjusting unit of the cooking device can receive a stop signal (that is, off signal) of the cooking device, and the robot 100a or the user can adjust the cooking time of the cooking device by controlling the temperature control unit of the operation unit 120.

The robot 100a may adjust the temperature level and the cooking time of the cooking device 100e by touching/rotating/pressing the operation unit 120. The robot 100a may increase or decrease the temperature level by controlling the operation unit 120 while cooking is being performed by the cooking device 100e.

Hereinafter, an embodiment in which the cooking device 100e is operated by the robot 100a will be described in detail.

The temperature level of the cooking device 100e may be set to a plurality of levels such as weak, medium, and strong, or weak, medium, strong, and ultra-strong. In addition, the temperature level of the cooking device 100e may be set to a plurality of levels having a specific numerical value such as a first operation, a second operation, . . . , and $N^{th}$ operation.

The robot system may include at least one robot 100a to operate the cooking device 100e. A plurality of robots 100a may be provided, and the plurality of robots 100a may operate the cooking device 100e in a state in which the plurality of robots 100a are spaced apart from each other. In addition, the robots 100a may cut cooking ingredients (for example, cucumbers, carrots, etc.) around the cooking device 100e to put the cooking ingredients into the cooking container F such as a frying pan or a pot, may stir the cooking ingredients contained in the cooking container F, or may transfer the cooked food from the cooking container F to another container.

The robot 100a for performing the above operations may include a plurality of arms 210, 220 and 230 and at least one arm connector 240 and 250 connecting the plurality of arms.

The plurality of arms 210, 220, and 230 may be sequentially disposed with the arm connectors 240 and 250 interposed therebetween.

The robot 100a may further include an end effector 260 installed on any one 230 of the plurality of arms 210, 220 and 230.

The end effector 260 may be a robot hand or a gripper, and may be mounted at an end of the robot 100a to perform various functions related to cooking so that the robot 100a may perform a task related to the cooking.

The plurality of arms 210, 220 and 230, and at least one arm connector 240 and 250 of the robot 100a may constitute a robot arm R configured to three-dimensionally move and rotate the end effector 260 to perform an operation related to the cooking.

The robot 100a may include at least one motor or actuator capable of rotating the arms 210, 220 and 230, the arm connectors 240 and 250, and the end effector 260.

The robot arm R constituting the robot 100a may be variously configured without being limited to the number or shape of the plurality of arms 210, 220 and 230, at least one arm connector 240 and 250, the motor and the actuator as long as it can three-dimensionally move and rotate the end effector 260.

The robot 100a may further include a robot connector 270 that connects/supports another one 210 of the plurality of arms 210, 220 and 230 to another object around the cooking device.

Another object to which the robot connector 270 is connected/supported may be furniture such as a storage cabinet provided in a room where the cooking device 100e is installed.

Another object to which the robot connector 270 is connected/supported may include an ingredient supply module D that is provided in a room where the cooking device 100e is installed to supply cooking ingredients to the robot 100a. In this case, the ingredient supply module D may supply ingredients to the robot 100a, and the robot 100a may receive the ingredients from the ingredient supply module D to use the ingredients for cooking.

The robot system may further include a controller for controlling the operation of the robot 100a.

The controller may be mounted on the robot 100a to constitute a part of the robot 100a, or to constitute all or part of the server 500 to which the robot 100a is connected.

The robot 100a constituting the robot system may be configured as an AI device to perform the cooking operation using an artificial neural network or the robot 100a may perform the cooking operation by using data stored in the memory 170 and the program of the processor 180 without using the artificial neural network. For the sake of convenience, the controller will be denoted with reference numeral 180 the same as the processor.

The robot system may include at least one sensor for sensing a danger factor around the cooking device 100e.

The sensor may sense a danger factor associated with a fire. For this purpose, the sensor may be disposed around the cooking device 100e or on the robot 100a.

The sensor may include a dust sensor 280 disposed around the cooking device 100e or on the robot 100a to sense the concentration of foreign substances. The dust sensor 280 may be a concentration sensor capable of sensing fine dust concentration such as oil vapor.

An example of the dust sensor 280 may be an optical sensor, and the dust sensor 280 has a housing having an opening through which external air may be introduced, a light source such as an LED or a laser that can irradiate air introduced into the housing with light, and a light-receiving element such as a photodiode or a phototransistor for detecting the amount of light scattered by fine dust such as oil vapor.

The dust sensor 280 may output the concentration (that is, foreign substance concentration) of the fine dust detected by the light receiving element as a concentration sensing value (for example, voltage).

The dust sensor 280 may be a sensor for sensing whether the concentration of the oil vapor around the cooking container F may cause explosion around a crater 100f of the cooking device 100e, and the dust sensor 280 may sense the foreign substance concentration at a position close to the cooking container F or the cooking device 100e. The dust sensor 280 may be located in an area where oil vapor is mainly located during the cooking by the cooking device 100e, for example, may be installed in the robot arm R. The dust sensor 280 may be installed on a portion of the robot arm, which is close to the cooking device 100e. For example, the dust sensor 280 may be installed on the robot arm 230 in which the end effector 260 is installed from among the plurality of robot arms 210, 220, and 230.

The controller 180 may calculate (or determine) a danger level to be described below by using a concentration sensing value such as a voltage output from the dust sensor 280.

The sensor may include a temperature sensor 290 disposed around the cooking device 100e or on the robot 100a to sense the temperature of the cooking container F or the cooking device 100e. The temperature sensor 290 may be configured as a non-contact temperature sensor capable of sensing the temperature without making contact with the cooking container F or the cooking device 100e. For example, the temperature sensor 290 may include an infrared sensor. The temperature sensor 290 may output the temperature sensing value to the controller 180.

One example of the temperature sensor 290 may include a non-contact type temperature sensor installed on the end effector 260, particularly, an infrared sensor.

The controller 180 may determine the danger level (levels 1 to 5) by the concentration sensing value of the dust sensor 280 and the temperature sensing value of the temperature sensor 290. The danger levels (levels 1 to 5) may be determined by a table or an equation previously stored in the memory 170 or by a learning model of an artificial neural network, and an example thereof is shown in Table 1 below.

TABLE 1

| Sensing temperature and Sensing concentration | Danger level | Temperature level | Cooking time | Notification |
|---|---|---|---|---|
| Less than T2 (255° C.) and less than P2 (42.5 mg/L) | Level 1 | OF (Optimal temperature level) | OT (Optimal time) | X |
| Equal to or higher than T2 (255° C.), or equal to or higher than P2 (42.5 mg/L) | Level 2 | 0.9 OF | 1.1 OT | X |
| Equal to or higher than T3 (270° C.), or equal to or higher than P3 (45 mg/L) | Level 3 | 0.8 OF | 1.2 OT | ○ |
| Equal to or higher than T4 (285° C.) or equal to or higher than P4 (47.5 mg/L) | Level 4 | 0.7 OF | 1.3 OT | ○ |
| Equal to or higher than T5 (300° C.) or equal to or higher than P5 (50 mg/L) | Level 5 | OFF | OFF | ○ |

The danger levels (level 1 to 5) may be determined with respect to respective ranges of the temperature sensing value and the concentration sensing value.

Among the plurality of danger levels (levels 1 to 5), the maximum temperature T5 and the highest concentration P5 of the highest level (level 5) may be determined in consideration of the concentration and temperature of the foreign substance, in particular, the oil vapor.

Typically, the flash point of the normal cooking oil that may be used in the cooking container F may be 300° C. to 315° C. Since the natural ignition temperature of such cooking oil is 395° C. to 405° C., the maximum temperature may be set to 300° C.

Meanwhile, since the optimal explosion concentration of the oil vapor floating around the cooking container F is typically 50 mg/L, the maximum concentration may be set to 50 mg/L.

When the danger level by the concentration sensing value is different from the danger level by the temperature sensing value, the controller 180 may determine a higher danger level as the current danger level, and the robot 100a may be controlled with the temperature level and cooking time according to the determined danger level.

The robot 100a may be controlled in a normal cooking mode and a safe mode, and may operate the cooking device 100e differently for each mode.

The normal cooking mode may be a mode in which the robot 100a controls/operates the cooking device 100e so that the cooking device 100e heats the cooking container F with the optimal temperature level OF and the optimal time OT.

The normal cooking mode may be performed when the risk of fire is not high, and the robot 100a and the cooking device 100e may heat the cooking container F with the optimal temperature level OF for the optimal time OT.

At the start of cooking, the robot 100a may operate the operation unit 120 to heat the cooking container F with the optimal temperature level and the optimal time according to the preset programming, and the optimal temperature level may be the temperature level manipulated by the operation unit 120 at the start of cooking.

The optimal time OT may be manipulated by the operation unit 120, and may be a cooking time which is set/input by the cooking device 100e to heat the cooking container F.

The optimal time OT may be a time required for the robot 100a to input the off (stop) command of the cooking device 100e through the operation unit 120 to complete the cooking after the cooking device 100e is turned on.

The controller 180 may periodically determine the danger level according to the concentration sensing value of the dust sensor 280 and the temperature sensing value of the temperature sensor 290 during the normal cooking mode, and may control the robot 100a in a safe mode such that at least one of the temperature level or the cooking time may vary according to the change of the danger level.

The safe mode may be performed when there is a risk of fire or there is a high risk of fire, and the robot 100a and the cooking device 100e may heat the cooking container F with a temperature level lower than the optimal temperature level OF for a time longer than the optimal time OT.

The safe mode refers to a mode for heating the cooking container F at a lower temperature for a longer time than the cooking conditions set through the operation unit 120 at the start of cooking. In the safe mode, the robot system may heat and maintain the cooking container F while minimizing the possibility of fire.

When the danger level is determined as level 1 as shown in Table 1, the controller 180 may control/maintain the robot 100a in the normal cooking mode without starting the safe mode, and the robot 100a may maintain the current cooking device 100e in consideration of the danger level while the cooking is performed for the optimal time OT without additionally operating the operation unit 120.

If the temperature sensing value is less than the lower limit temperature T2 and the concentration sensing value is lower than the lower limit concentration P2, the danger level may be the lowest level (level 1), and the controller 180 may control/maintain the robot 100a in the normal cooking mode.

When the danger level is determined/changed as levels 2 to 5 as shown in Table 1 during the cooking by the cooking device 100e, the controller 180 may control the robot 100a in a safe mode in which at least one of the temperature level or the cooking time changes.

In the safe mode, the controller 180 may control the robot 100a such that the temperature level is lower and the cooking time is longer as the danger level is higher.

The robot system may further include an alarm device 300. The controller 180 may output a signal of alarm information to the alarm device 300 when the danger level is greater than or equal to the alarm level.

The alarm level may be a level other than the lowest level (level 1) of the plurality of danger levels (level 1 to 5), for example, if there are five danger levels in total, the alarm level may be set to the third danger level (level 3) or the fourth danger level (level 4).

The alarm device 300 may be configured as a device capable of informing a danger by sound, such as a buzzer or a speaker. In addition, it is also possible to configure the alarm device 300 as a communication module capable of transmitting a signal of danger information to a terminal of a user or the server 500.

The robot system may stop the operation of the cooking device 100e when the danger level is the highest level (level 5). The highest level (level 5) may be a level acquired when at least one of the temperature sensing value or the concentration sensing value among the danger levels is subject to very dangerous situation. When the danger level is determined as the highest level, the controller 180 may control the robot 100a to turn off (stop) the cooking device 100e, the robot 100a may input the turn off (stop) of the cooking device 100a through the operation unit 120, and the cooking device 100e may be turned off (stopped) during the cooking without heating the cooking container F for the optimal time OT which is set at the start of cooking.

Figure 5:
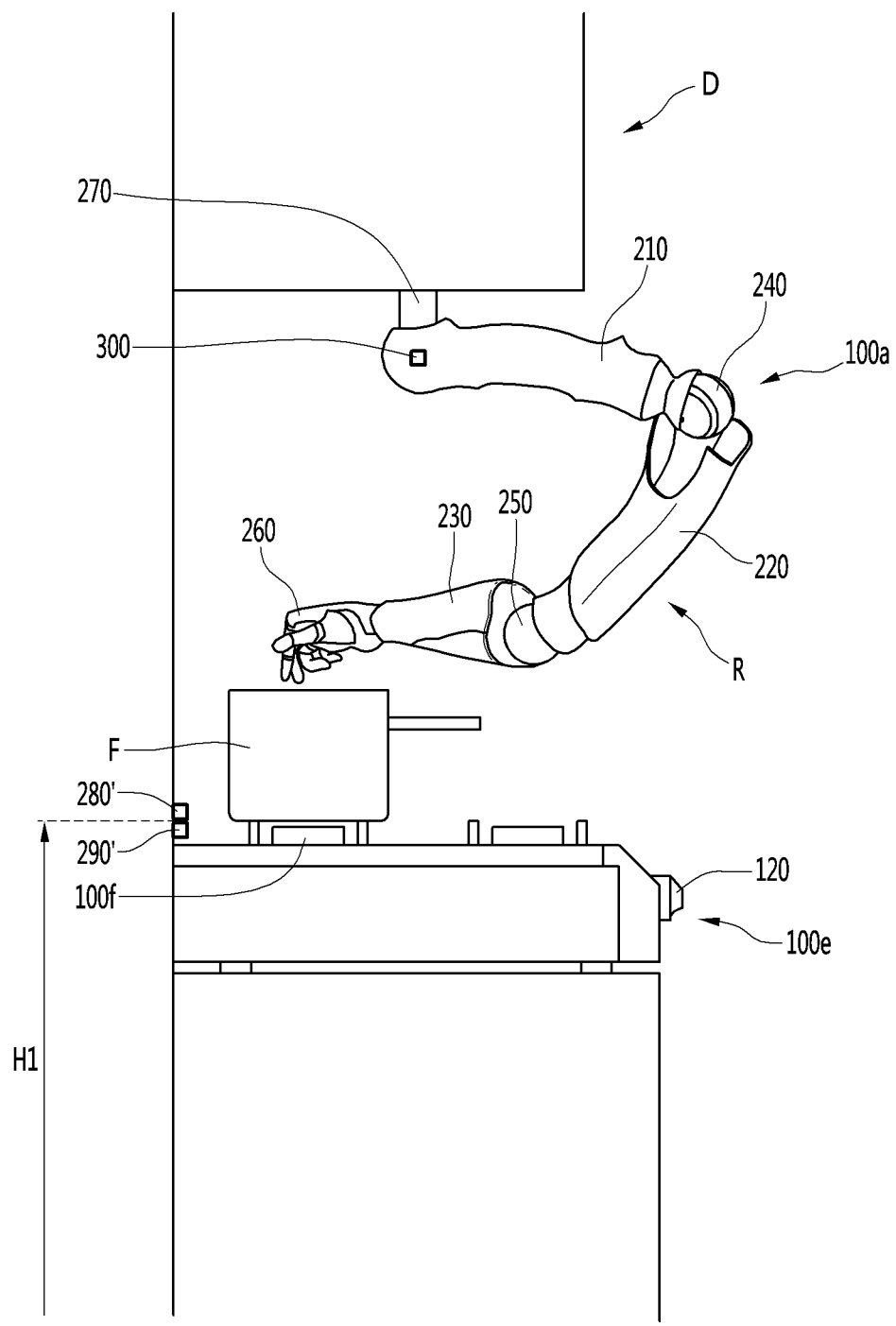
FIG. 5 is a side view illustrating another example of a robot system according to an embodiment.

FIG. 5 is a side view illustrating another example of a robot system according to an embodiment.

As illustrated in FIG. 5, a dust sensor 280' and a temperature sensor 290' may not be mounted on the robot 100a, but may be disposed around the cooking device 100e and spaced apart from the robot 100a. The dust sensor 280' and the temperature sensor 290' may be disposed above the cooking device 100e or at a height H1 parallel to the cooking container F.

Each of the dust sensor 280' and the temperature sensor 290' may be disposed at a height H1 positioned around the crater 100f of the cooking device 100e.

The robot 100a may move the end effector 260 and the arm 230 to an area other than above the cooking container F, and may move the end effector 260 and the arm 230 to a region far from the cooking container F.

The dust sensor 280' and the temperature sensor 290' may sense the concentration of the foreign substance around the crafter 100f of the cooking device 100e and may sense the temperature of the crafter 100f regardless of the position of the end effector 260 and the position of the arm 230. The robot system may determine the danger level around the crater 100f of the cooking device 100e with higher reliability.

That is, while the robot 100a performs the cooking operation, the dust sensor 280' may sense the concentration of foreign substance and transmit the concentration sensing value to the controller 180. In addition, while the robot 100a is cooking, the temperature sensor 290' may sense the temperature and transmit the temperature sensing value to the controller 180.

During the cooking operation, the controller 180 may determine whether the danger level is changed based on the concentration sensing value transmitted from the dust sensor 280' and the temperature sensing value transmitted from the temperature sensor 290'. If the danger level is changed, the cooking operation may be stopped and the operation unit 120 of the cooking device 100e may be controlled such that the temperature level and the cooking time may correspond to the changed danger level.

For example, the dust sensor 280' may transmit the concentration sensing value to the controller 180 and the temperature sensor 290' may transmit the temperature sensing value to the controller 180 while the robot 100a performs the cooking operation such as putting the food ingredient into the cooking container F or cutting the food ingredient.

While the robot 100a performs the above cooking operation, if there is a change in the danger level, the controller 180 may temporally stop the cooking operation that is already being performed in order to change at least one of the temperature level or the cooking time and may control the operation unit 120 of the cooking device 100e to change least one of the temperature level or the cooking time.

As described above, the robot 100a may resume the cooking operation that has been temporally stopped after adjusting at least one of the temperature level or the cooking time through the operation unit 120.

Figure 6:
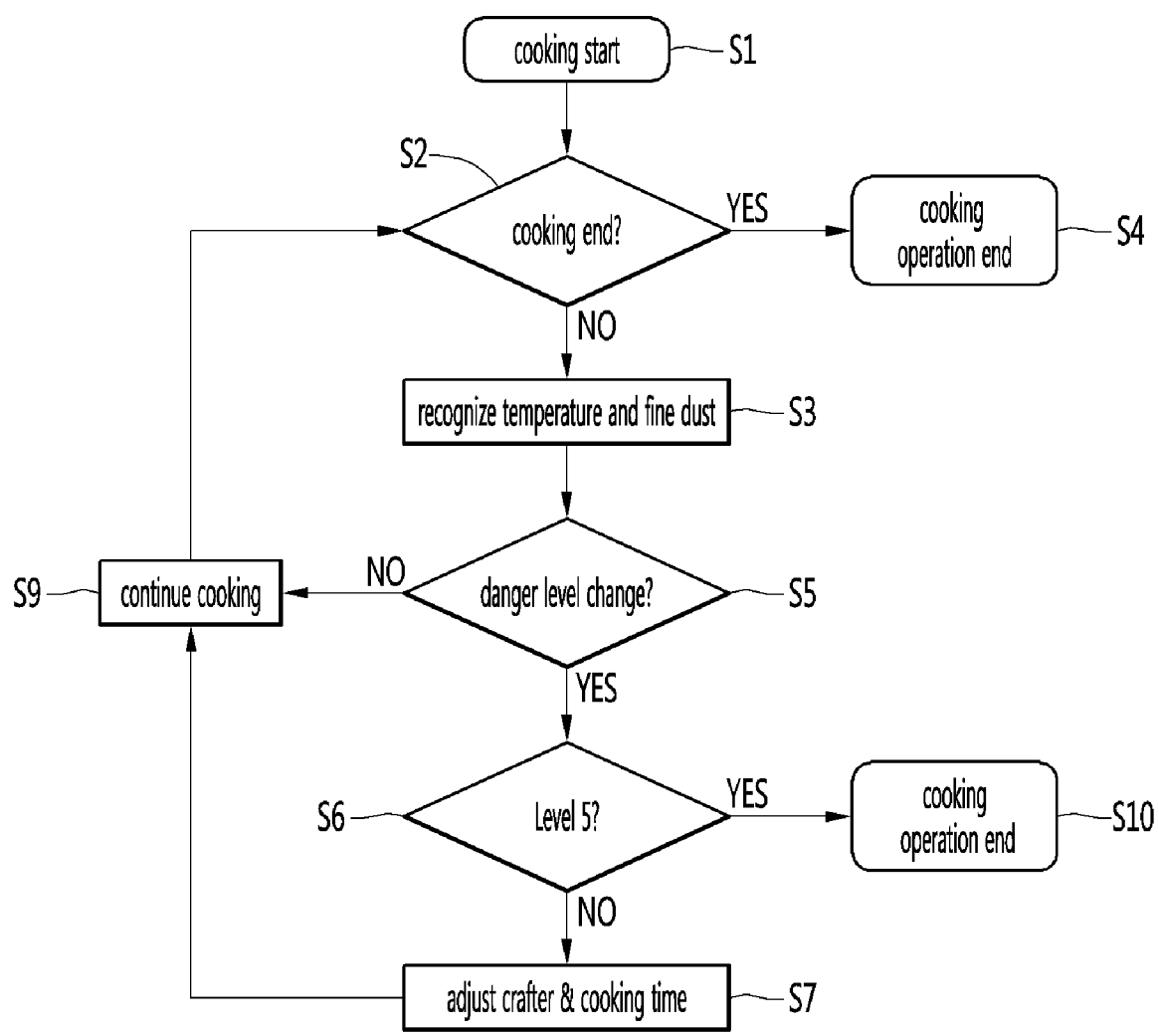
FIG. 6 is a flowchart illustrating a control method of a robot system according to an embodiment.

FIG. 6 is a flowchart illustrating a control method of a robot system according to an embodiment.

The control method of the robot system shown in FIG. 6 may control the robot system including the cooking device 100e for heating the cooking container F; and the robot 100a for adjusting the temperature level and the cooking time of the cooking device 100e. In particular, the robot 100a may be controlled to adjust the temperature level and the cooking time of the cooking device 100e.

The control method of the robot system may include sensing operations S1, S2, and S3.

The sensing operations S1, S2, and S3 may be performed after the cooking is started by the cooking device 100e, and the dust sensor 280 disposed around the cooking device 100e or on the robot 100a may sense the concentration of foreign substances, and the temperature sensor 290 disposed around the cooking device 100e or on the robot 100a may sense the temperature of the cooking container F or the cooking device 100e during the sensing operations S1, S2, and S3.

The dust sensor 280 and the temperature sensor 290 may periodically sense to output the sensing value to the controller 180 and the controller 180 may determine the danger level based on the concentration sensing value and the temperature sensing value sensed during the sensing operations S1, S2, and S3.

During the sensing operations S1, S2, and S3, the robot 100a may perform a predetermined cooking operation. The robot 100a may perform a cooking operation such as trimming or cutting food ingredients around the cooking device 100e, or may perform the cooking operation such as inputting the food ingredients into the cooking container F.

During the cooking operation of the robot 100a as described above, the dust sensor 280 may sense the foreign substances and transmit the concentration sensing value to the controller 180, and the temperature sensor 290 may sense the temperature and transmit the temperature sensing value to the controller 180.

After the cooking is started by the cooking device 100e, a special situation such as completion of cooking in a short time may occur in the robot system, or a cooking termination may be requested by a user or an administrator. In this case, the robot 100a may perform stop operations S2 and S4 by controlling the operation unit 120 to terminate the cooking by the cooking device 100e.

Meanwhile, the control method of the robot system may include variable cooking operations S5, S6, and S7 performed after the sensing operations S1, S2 and S3.

The variable cooking operations S5, S6, and S7 may be performed when there is a change in the danger level determined by the concentration sensing value and the temperature sensing value sensed in the sensing operations S1, S2, and S3.

The variable cooking operations S5, S6, and S7 may be performed when the danger level is neither the lowest level (level 1) nor the highest level (level 5). The variable cooking operations S5, S6, and S7 may be performed when the danger level is intermediate levels (level 2 to level 4) between the lowest level (level 1) and the highest level (level 5). In the variable cooking operations S5, S6, and S7, the robot 100a may control the cooking device 100e with a temperature level and a cooking time corresponding to the changed danger level.

When the danger level by the concentration sensing value is different from the danger level by the temperature sensing value, the robot 100a may control the cooking device 100e with a temperature level and a cooking time corresponding to a higher danger level. In the variable cooking operations S5, S6, and S7, the robot 100a may operate the cooking device 100e during the cooking in such a manner that the temperature level is lower and the cooking time is longer as the danger level is higher.

The control method of the robot system may return to the sensing operations S1, S2, S3, and S4 after the variable cooking operations S5, S6, and S7, and the robot system may perform the variable cooking operations S5, S6, and S7 at least two times until the cooking is completed.

If the concentration sensing value is lower than the lower limit concentration P2 and the temperature sensing value is lower than the lower limit temperature T2, the danger level may be the lowest level (level 1). In this case, the robot system may perform the normal cooking operations S5 and S9 to maintain the current cooking mode. When the concentration sensing value is lower than the lower limit concentration and the temperature sensing value is lower than the lower limit temperature, since the possibility of fire is low, the robot 100a does not change the temperature level or the cooking time, and may maintain the current state S5 and S9 of the cooking device 100e.

In addition, if there is no change in the danger level determined by the concentration sensing value and the temperature sensing value sensed in the sensing operations S1, S2, and S3, the normal cooking operation S4 and S9 may be performed to maintain the current cooking of the cooking device 100e.

If the concentration sensing value and the temperature sensing value do not fluctuate significantly during the cooking by the cooking device 100e, the robot 100a does not change the temperature level or the cooking time, and the cooking device 100e may maintain the current state.

The control method of the robot system may further include an alarm operation of outputting a signal of alarm information to the alarm device 300 when the danger level is equal to or higher than the alarm level (for example, level 3). The robot 100a may output a signal of alarm information to the alarm device 300 even when the highest level.

In addition, the control method of the robot system may further include stop operations S6 and S10 of stopping the cooking device 100e if the danger level is the highest level (level 5).

According to an embodiment, before the fire is caused by foreign substances (fine dust, etc.) around the cooking device, it is possible to minimize the possibility of fire by adjusting the temperature level of the cooking device, and the optimal cooking can be performed by using the cooking device and the robot by adjusting the cooking time in consideration of the adjusted temperature level.

In addition, since the concentration of the foreign substances and the temperature around the cooking device can be sensed at the optimal position, it is possible to operate the cooking device by taking into consideration the danger of fire with high reliability.

Further, since the cooking device is operated based on the higher danger level between the danger level by the concentration sensing value and the danger level by the temperature sensing value, the fire can be prevented with high reliability.

In addition, when the concentration sensing value is less than the lower limit concentration and the temperature sensing value is less than the lower limit temperature, the temperature level and the cooking time of the cooking device are not changed, so that it is possible to prevent the total cooking time from being unnecessarily delayed.

Further, since the temperature level is lower and the cooking time is longer as the danger level is higher, it is possible to minimize the possibility of fire caused by foreign substances.

In addition, when the danger level is equal to or higher than the alarm level, a signal of alarm information is output to the alarm device, so that the user can be notified of the change in the cooking time in consideration of the possibility of fire or can be notified of the possibility of fire, so that the convenience of cooking using the robot can be improved.

Further, if the danger level is the highest level, the robot stops the operation of the cooking device, so that high safety is ensured.

The foregoing description is merely illustrative of the technical idea of the present invention and various changes and modifications may be made by those skilled in the art without departing from the essential characteristics of the present invention.

Therefore, the embodiments disclosed in the present disclosure are intended to illustrate rather than limit the technical idea of the present invention, and the scope of the technical idea of the present invention is not limited by these embodiments.

The scope of protection of the present invention should be construed according to the following claims, and all technical ideas falling within the equivalent scope to the scope of protection should be construed as falling within the scope of the present invention.

What is claimed is:
1. A robot system comprising:
 a cooking device having an operation unit configured to select a temperature level to heat a cooking container with the temperature level selected by the operation unit;
 a robot configured to control the temperature level and a cooking time of the cooking device;
 a dust sensor disposed on the robot to sense a concentration of foreign substances;
 a temperature sensor disposed on the robot to sense a temperature of the cooking container or the cooking device; and
 a controller configured to control the robot in a safe mode so that at least one of the temperature level and the cooking time is varied according to a danger level determined by a concentration sensing value of the dust sensor and a danger level determined by a temperature sensing value of the temperature sensor,
 wherein the robot includes:
  a robot arm having a plurality of arms and at least one arm connector connecting the plurality of arms; and
  an end effector installed on the robot arm,
 wherein the dust sensor is installed on the robot arm,
 wherein the temperature sensor includes an infrared sensor installed on the end effector, and
 wherein, when the danger level determined by the concentration sensing value is different from the danger level determined by the temperature sensing value, the controller controls the robot to operate the cooking device with a temperature level and a cooking time according to a higher danger level.

2. The robot system according to claim 1, wherein the dust sensor is configured to sense the concentration of the foreign substances to transmit the concentration sensing value to the controller while the robot is cooking.

3. The robot system according to claim 1, wherein the temperature sensor is configured to sense the temperature to transmit the temperature sensing value to the controller while the robot is cooking.

4. The robot system according to claim 1, wherein, when the concentration sensing value is less than a lower limit concentration and the temperature sensing value is less than a lower limit temperature, the danger level is a lowest level and the controller controls the robot in a normal cooking mode.

5. The robot system according to claim 1, wherein the controller controls the robot to lower the temperature level and to lengthen the cooking time as the danger level is higher.

6. The robot system according to claim 1, further comprising an alarm device, wherein the controller is configured to output a signal of alarm information to the alarm device when the danger level is equal to or higher than an alarm level.

7. The robot system according to claim 1, wherein the controller is configured to stop an operation of the cooking device by the robot when the danger level is a highest level.

8. The robot system according to claim 1, wherein the end effector is a robot hand or a gripper, and
 wherein the end effector is mounted at an end of the robot arm.

9. The robot system according to claim 1, wherein the operation unit is configured to select the temperature level and the cooking time.

10. The robot system according to claim 1, wherein the robot further includes a robot connector, and wherein the robot connector connects at least one of the plurality of arms to an object around the cooking device.

11. A method of controlling a robot system including a cooking device configured to heat a cooking container, a robot configured to adjust a temperature level and a cooking time of the cooking device and a controller configured to control the robot, the method comprising:
sensing a foreign substance concentration using a dust sensor disposed on the robot, and a temperature of the cooking container or the cooking device using a temperature sensor disposed on the robot; and
controlling the cooking device variably, by the robot, with a temperature level and a cooking time according to a changed danger level, when a danger level determined by a concentration sensing value sensed by the dust sensor and a danger level determined by a temperature sensing value sensed by the temperature sensor is changed and the danger level is not a lowest level or a highest level,
wherein the robot includes:
a robot arm having a plurality of arms and at least one arm connector connecting the plurality of arms; and
an end effector installed on the robot arm,
wherein the dust sensor is installed on the robot arm,
wherein the temperature sensor includes an infrared sensor installed on the end effector, and
wherein, when the danger level determined by the concentration sensing value is different from the danger level determined by the temperature sensing value, the controller controls the robot to operate the cooking device with a temperature level and a cooking time according to a higher danger level.

12. The method according to claim 11, wherein the robot performs a cooking operation while the dust sensor is sensing foreign substances and the temperature sensor is sensing the temperature in the sensing.

13. The method according to claim 12, wherein the dust sensor and the temperature sensor transmit sensing values to the controller while the robot is performing cooking.

14. The method according to claim 11, wherein the danger level is the lowest level when the concentration sensing value is less than a lower limit concentration and the temperature sensing value is less than a lower limit temperature, and
wherein the method further comprises performing a normal cooking of maintaining a current cooking of the cooking device when the danger level is the lowest level.

15. The method according to claim 11, further comprising performing a normal cooking of maintaining a current cooking of the cooking device when the danger level determined by the concentration sensing value and the temperature sensing value sensed in a sensing operation is not changed.

16. The method according to claim 11, wherein the robot is controlled to lower the temperature level and to lengthen the cooking time as the danger level is higher in the controlling the cooking device variably.

17. The method according to claim 11, further comprising outputting a signal of alarm information to an alarm device when the danger level is equal to or higher than an alarm level.

18. The method according to claim 11, further comprising stopping an operation of the cooking device by the robot when the danger level is the highest level.

19. The method according to claim 11, further comprising returning to the sensing after the controlling the cooking device variably.

* * * * *